UNITED STATES PATENT OFFICE.

FRANCIS M. CHALFANT, OF MORGANTOWN, WEST VIRGINIA.

IMPROVEMENT IN THE MANUFACTURE OF SORGHUM-SUGAR.

Specification forming part of Letters Patent No. 59,183, dated October 30, 1866.

*To all whom it may concern:*

Be it known that I, FRANCIS M. CHALFANT, of Morgantown, in the county of Monongalia and State of West Virginia, have invented a new and Improved Process for Making Sorghum-Sugar; and I do hereby declare the following to be a full, clear, and exact description of the same, sufficient to enable one skilled in the art to which the invention appertains to make use of it.

This process is intended to remove the feculencies and neutralize the acids in the juice as it comes from the mill, and, by speedily purifying the sirup, to prevent the disorganization of the crystallizable sugar present therein.

The amount of crystallizable sugar in the juice of the sorghum and its allies has been much understated, though it, of course, varies much with soil, season, casualties, varieties, culture, and location. Irrespective of all the variations in opinion due to these modifying circumstances, the amount present of crystallizable sugar in juice from an average cane is much understated. For instance, it is commonly believed that fifteen per cent. of crystallizable sugar is a fair yield from the concentrated sirup, the greater portion of saccharine present being grape-sugar, and fit only to make molasses. It is not very long since that it was popularly believed to yield no crystals, and small portions of crystallized sugar derived from the sorghum-juice by a process equivalent to that of a laboratory were shown as objects of interest.

I can develop from a good article of fresh sorghum-juice as much as fifty per cent. of the weight of the condensed sirup in crystallized sugar of good color.

My process is as follows: The juice, as it comes from the mill, is thoroughly filtered through reeds or straw, the acid which it contains being immediately neutralized by the use of alum alone, or in combination with lime or bisulphite of lime. The juice is then gradually heated and the rising feculencies removed by the skimmer. The alum, &c., aids in bringing the impurities to the surface, probably by assisting the coagulation of the albuminous and mucilaginous portions. This stage passed, the heat is rapidly increased to 220° Fahrenheit, small portions of acetic acid being added from time to time to the boiling mass, stirring briskly, the remaining impurities, together with some excess of neutralizing matter, being removed by the brisk operation of boiling and the skimmer. The heat is raised to 230° Fahrenheit, and the evaporation continued till the juice is sufficiently condensed for crystallization, when it is removed to a room having a temperature of about 90° Fahrenheit, which is preserved while the process of crystallization is going on.

The latter process is hastened by the addition of crystal lactine or chloride sodium, the former preferred, as it can be used in large quantities without injury to the flavor.

The crystals form nuclei, around which the process of crystallization of the sugar is initiated, and the result is much more rapidly attained than by the ordinary process of abandoning the sirup to the unaided formation of crystals.

Analogies drawn from other branches of manufactures which eventuate in the formation of crystalline products indicate how much that operation is expedited by the exhibition of crystals to the mass about to assume the transformation, and it has been my object to expedite all the processes to the greatest extent, for I am aware that the ineffectual and imperfect results heretofore attained are due to the effect of the active agents present in the juice or developed during the process, which have a constant tendency to impair the character of the true sugar present and give it a glucose character.

It is for the purpose of preserving the true sugar from this deleterious transformation that I exhibit neutralizing agents to intercept chemical changes in the juice, and I endeavor, by the neutralization, coagulation, and the direct effect of heat, to place the various impurities and feculencies, as well as the active agents, in preventing chemical changes, in such a condition as to be removable or to render them harmless, especially the former.

The granulation of the sugar having ceased, the mass is placed in bags and subjected to heavy pressure, the non-crystallizable portion being thereby removed with speed and completeness.

Having described my invention, what I claim as new, and desire to secure by Letters Patent, is—

The process of making sugar from sorghum or its allies, substantially as above described.

To the above specification of my improved process of making sorghum-sugar I have signed my hand this 27th of August, 1866.

F. M. CHALFANT.

Witnesses:
 EDWARD H. KNIGHT,
 SOLON C. KEMON.